Dec. 23, 1941.　　　O. C. WATSON　　　2,266,930
AUTOMATIC SHUT-OFF VALVE DEVICE
Filed Aug. 15, 1938　　　3 Sheets-Sheet 3
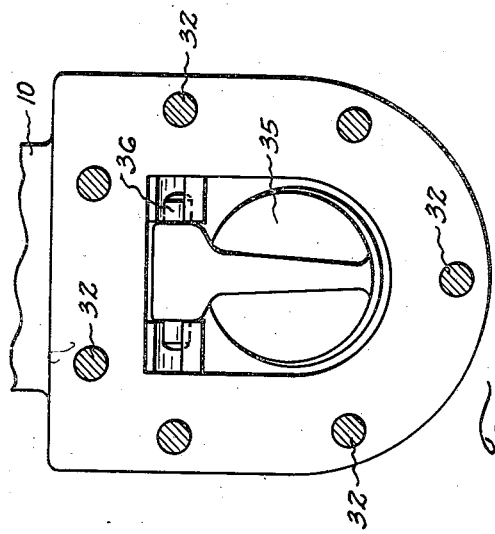
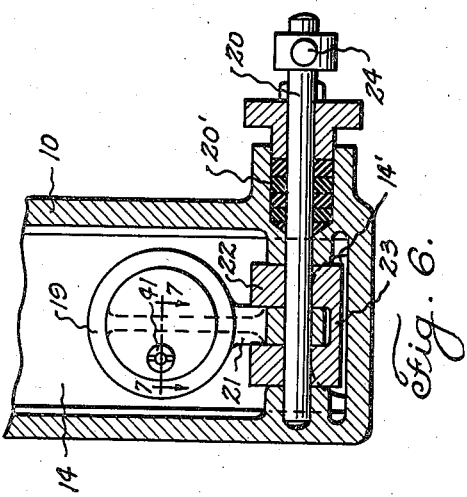
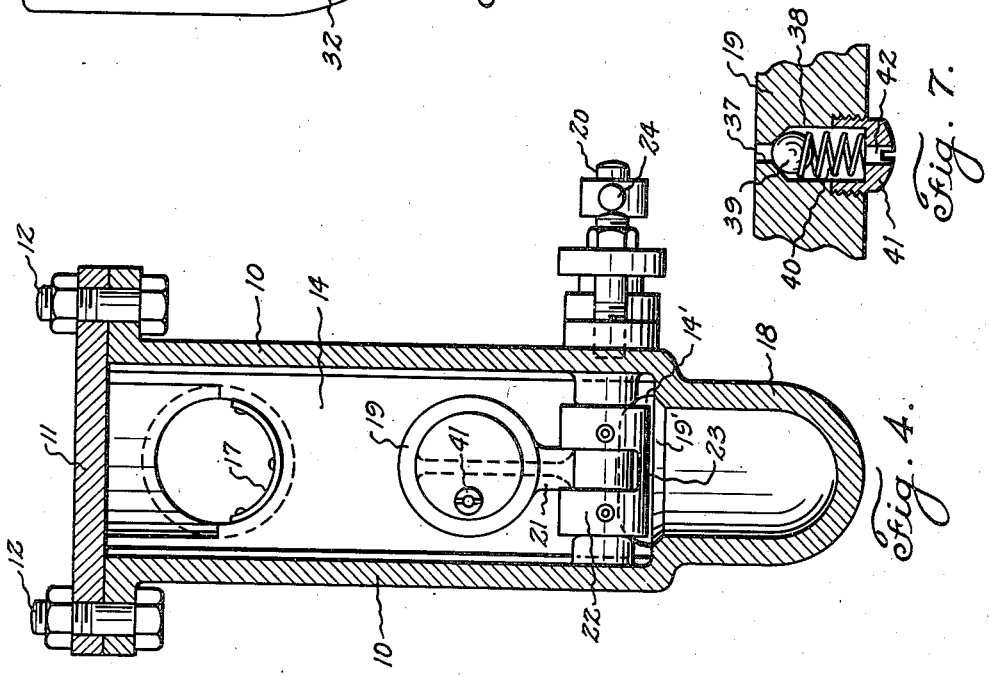
Inventor
Orville C. Watson
By Jack A. Ashley
Attorney Patented Dec. 23, 1941

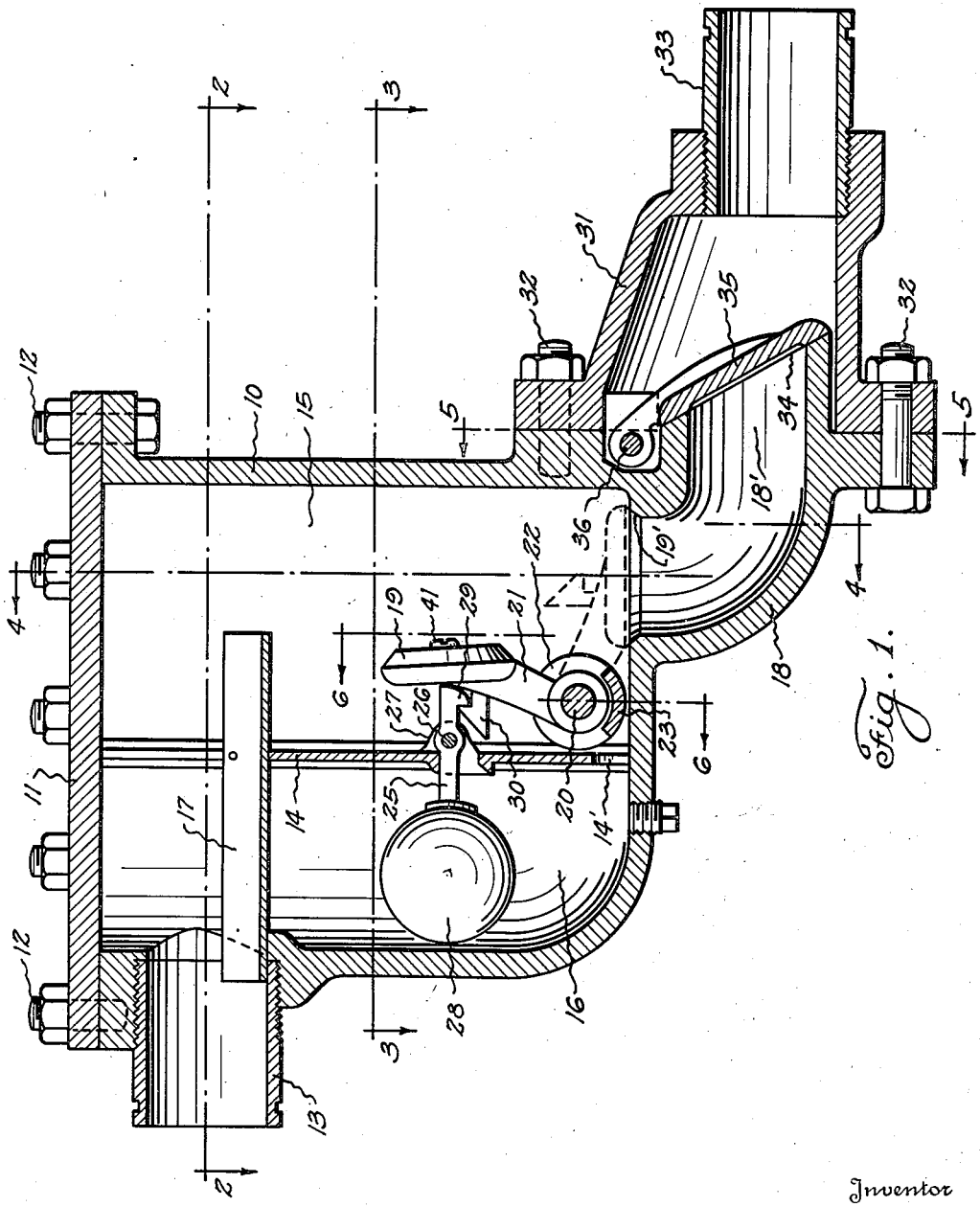

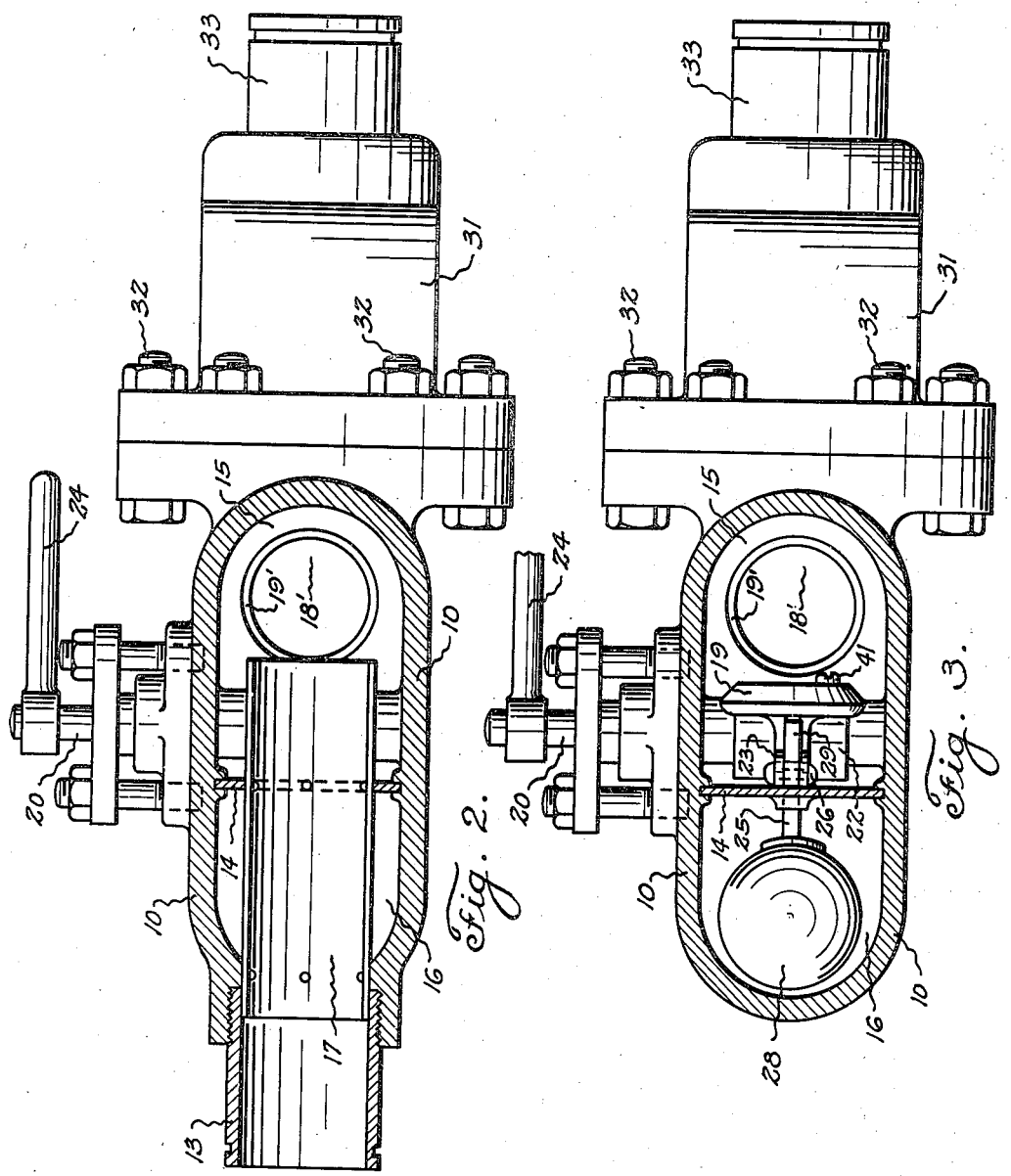

2,266,930

UNITED STATES PATENT OFFICE 2,266,930

AUTOMATIC SHUT-OFF VALVE DEVICE

Orville C. Watson, Freeman, Mo.

Application August 15, 1938, Serial No. 224,852

6 Claims. (Cl. 277—45)

This invention relates to new and useful improvements in automatic shut-off valve devices.

One object of the invention is to provide an improved valve device which is particularly adapted for use with pipe lines and similar conductors where it is important to completely shut off the passage of all fluids when the flow of the fluid being conducted ceases, whereby the line is prevented from becoming air bound and air is prevented from flowing through the line. The advantages of such a device are that loss of time is prevented; fire, creek crossing and line breaking hazards are reduced to a minimum, capacity of gravity lines is maintained, air bleeders are eliminated and a more reliable device is made available.

An important object of the invention is to provide a valve device of the character described wherein the valves are automatically closed when the flow of fluid stops but wherein one of the valves requires manual opening which enables the operator to control the running of liquids such as oil through the device and give a positive check as to when the flow of liquid was started.

A further object of the invention is to provide a device of the character described wherein a valve is provided and arranged to be automatically closed to prevent the flowing fluid from backing up in the line when excessive pressure is developed or from other causes.

Still another object of the invention is to provide a shut-off valve with means normally holding it open and arranged to be actuated by the liquid being conducted to cause automatic closing of the valve when said liquid ceases to flow, thus preventing any possibility of slow drainage or such delay in the closing of the valve which would allow air to enter the line and cause undesirable results.

Another object of the invention is to provide float controlled means for holding the shut-off valve open arranged in a quiescent chamber so as not to be disturbed by the flow of the fluid through the device and assuring the most efficient and expeditious operation.

A further object of the invention is to provide a shut-off valve device wherein the discharge is considerably lower than the inlet so as to provide adequate drainage and cleansing and thus eliminate pockets and other obstructions which would collect sediment and clog the device or wherein water would accumulate and freeze.

A particular object of the invention is to provide a shut-off valve device wherein a float-controlled valve is used and held open during flow together with means for diverting a greatly reduced flow stream from the float, whereby delayed action of the float and tardy closing of the valve is prevented.

A still further object of the invention is to provide pressure releasing means arranged to resist any suction set up in the discharge line from the device, but to open to relieve pressure which may accumulate in the inflow line when the valve is closed.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a longitudinal, vertical, sectional view of an automatic shut-off valve device constructed in accordance with the invention, Figure 2 is a horizontal, cross-sectional view taken on the line 2—2 of Figure 1, Figure 3 is a similar view taken on the line 3—3 of Figure 1, Figure 4 is a transverse, vertical, sectional view taken on the line 4—4 of Figure 1, Figure 5 is a similar view taken on the line 5—5 of Figure 1, Figure 6 is a partial, transverse, vertical, sectional view of the device taken on the line 6—6 of Figure 1, and Figure 7 is a sectional view taken on the line 7—7 of Figure 6.

In the drawings, the numeral 10 designates a relatively narrow upright valve body or case having its open top covered by a plate or closure 11 removably secured thereon by means of bolts 12. Near its top the body has a nipple 13 screwed thereinto and this nipple is adapted to be connected with a pipe line or other conductor on the upstream side so that the liquid or fluid being conducted will be discharged into the body.

A transverse, vertical partition 14 divides the body into a valve chamber or compartment 15 and a float chamber or compartment 16. As is clearly shown in Figures 1 and 4, the upper end of the partition is cut out and formed to receive a trough 17 which is arcuate in cross-section and extends from the nipple 13 across said partition and well into the compartment 15. The trough may be suitably fastened in place and serves to convey liquid flowing from the pipe line through the nipple 13 across the chamber 16 and discharge it into the compartment 15. The partition has an opening 14' at its lower end so that liquid discharged into the compartment 15 may flow through said opening into the chamber 16 to the same level as maintained in said compartment 15. By this arrangement the chamber 16 is made quiescent and is protected from the agitation or disturbance set up by the fall of the liquid from the trough 17 into the compartment 15.

An elbow 18 is shown as formed integral with the bottom of the body 10 and as extending from the bottom of the compartment 15 but it is to be understood that this elbow may be made separately, if desired. The elbow provides a flow passage 18' on the downstream side of the body and directly in the line of flow from said body. At the inlet end of the passage which is at the bottom of the compartment 15, there is provided a bevelled valve seat 19' for receiving a complementary shut-off valve 19 which is pivoted upon a shaft 20, and may be moved from the position shown in full lines to the position shown in dotted lines in Figure 1.

The valve is provided with an elongate ear 21 loosely journaled on the shaft 20 within a yoke 22, which is fastened on said shaft. As is shown in Figures 1, 4 and 6, the yoke has a transversely curved web 23 overlying the journal of the ear 21 so that the valve 19 is free to swing downward to its closed position, but when the yoke is revolved in a counterclockwise direction (Figure 1) it will engage the ear 21 and swing the valve upwardly to its open position.

The shaft 20 extends through a stuffing box 20' (Figure 6) mounted in one side of the valve body 10. A handle 24 is fastened on the projecting end of the shaft whereby the shaft may be manually revolved to open the valve 19 as above described. A latch lever 25 is fulcrumed upon a shaft 26 mounted in ears 27 on the partition 14. The latch lever extends through said partition and has a float 28 secured on its end in the chamber 16. On the opposite end of the latch lever is a latch hook 29 adapted to engage a keeper 30 mounted on top of the valve 19, whereby said valve is maintained in its open position whenever the level of the liquid in the chamber 16 is sufficiently high to maintain the float at the position shown in Figure 1. It is obvious that whenever the float 28 falls the lever 25 will be swung and the latch hook 29 withdrawn from the keeper 30, whereby the valve 19 is released and will automatically swing down onto the seat 19' and thus shut off the flow through the passage 18'.

The discharge end of the elbow 18 projects into a bonnet 31 which is secured to the valve body by bolts 32. The outer end of the body is reduced and internally screw-threaded for receiving a nipple 33 to which the downstream side of the pipe line is suitably connected. The discharge end of the elbow is cut off at an angle to the perpendicular to form an inclined seat 34 against which a gravity closing check valve 35 may engage. The angle of inclination of the seat 34 is sufficient to provide a full seating of the check valve 35, even though the device is tilted so that the bonnet 31 is inclined downwardly or otherwise disturbed. The valve is pivoted at 36 in the body and may be of any suitable construction.

The operation of the shut-off device is as follows: Assuming the valve 19 is in its open position as shown in full lines in Figure 1 of the drawings, and liquid is flowing into the compartment 15 through the trough 17; it is obvious that the liquid will build up in the passage 18' and the body 10 until it develops sufficient head or force to open the valve 35 and thus flow into the bonnet 31 and nipple 33. The device is so designed that a level of liquid will be maintained in the chamber 16 at such a level as to support the float 28 at about the position shown in Figure 1, whereby the latch hook 29 will remain in engagement with the keeper 30, thus holding the shut-off valve 19 in its open position.

Should the flow of liquid from the pipe line into the nipple 13 cease or be cut off, the water level in the float chamber 16 will immediately begin to lower whereby the float 28 will be moved downwardly. The fall of the float will be rapid and, therefore, the valve 19 will be quickly unlatched so that it may automatically swing down and close upon the seat 19'. The float being cut off through the elbow 18, it is obvious that the valve 35 will quickly seat by gravity. By observing Figure 1 it will be seen that the trough has a considerable depth and thus if the flow is reduced to a small stream it will not overflow into the chamber 16 and accumulate therein, owing to the small outlet 14', and delay the falling action of the float which would slow down the release and closing of the valve 19.

When the valves 19 and 35 are closed, air cannot pass the same and thus any air in the upstream pipe line cannot flow to the downstream pipe line or vice versa. It is obvious that air cannot collect in the pipe line and pass the valve device nor can the pipe line become air-bound. This has several advantages which are more or less obvious. By preventing air from entering the line, it is possible in many instances to flow liquid by gravity which would otherwise have to be pumped. Where the device is used with oil pipe lines, this may save a pumping expense.

In order to prevent trapping of gas and to relieve any pressure which might accumulate, a pressure relief opening 37 is provided in the valve 19 and communicates with an enlarged bore 38 in which a ball valve 39 is confined as is best shown in Figure 7. A coiled spring 40 is held in the bore by a cap 41 and urges the valve to normally close the vent 37. The cap has a port 42 and is placed on the underside of the valve. The spring is placed under sufficient compression as to resist opening by any suction set up through the parts 33, 31 and 18', but to permit the ball to unseat when pressure accumulates above the valve 19 when the latter is closed.

It is desirable to make the bearing and the movable parts quite loose so that such parts will move freely and small particles of sand or other extraneous matter will not impede their operation. The device is made sufficiently strong to handle the high pressures used in gathering systems with a good margin of safety.

When flow through the device is cut off, it is usually due to the shutting of a stop cock or some other valve in the line flowing to said device, although flow might be stopped for other reasons. When flow is resumed the trough 17 will discharge the liquid into the compartment 15. The valve 19 being closed, such liquid will rise in the compartment and also flow through the opening 14' and rise in the chamber 16, whereby the float 28 will be raised. The operator opens the valve 19 by swinging the handle 24 upwardly whereby the yoke 22 is revolved which causes the web 23 to engage the arm 21 and swing the valve 19 from its dotted position shown in Figure 1 to its open position shown in full lines. When the valve reaches its upper position the keeper rides under the latch hook 29, thus latching itself. When the valve is latched the lever is swung down to its horizontal position.

The operator is able at all times to ascertain whether the valve 19 is opened or closed by merely swinging the handle 24. This device is particularly adapted for use in pipe lines leading from oil storage tanks. It is customary to close the valve (not shown) supplying oil to the tank and to open the stop cock (not shown) to run oil from the tank into the pipe line. When the tank is emptied the shut-off valve 19 will automatically close and prevent air flowing into the line. Should it occur that the stop cock is left open when the inlet valve to the tank is opened, it is obvious that the valve 19 being closed, the device would prevent emptying the tank into the pipe line beyond said valve.

What I claim and desire to secure by Letters Patent, is:

1. An automatic shut-off valve device including, a body portion having an inlet opening and a discharge opening, a partition dividing the body portion into a float chamber and a valve compartment, said partition having an opening establishing communication between the float chamber and valve compartments, whereby liquid enters the float chamber from the valve compartment, means for first delivering liquid to the valve compartment, a valve for controlling the passage of liquid from the body portion, and a float-controlled latch member normally holding the valve in its open position, said latch member adapted to release the valve closing the discharge passageway when the liquid in the body portion reaches a predetermined level.

2. In an automatic pipe line shut-off valve device the combination with, an upright body having means for dividing it into a valve compartment and a float chamber, an inlet at the upper end of the float chamber, a trough extending from the inlet across the float chamber for discharging liquid into the valve compartment, a conductor leading from the valve compartment and having a valve seat at its inlet, a valve pivoted in the valve compartment and arranged to automatically engage the seat of the conductor, and valve holding means engaging the valve for holding it in an open position and provided with a float disposed in the float chamber, the trough being sufficiently deep to carry a small stream flow across the float chamber and prevent overflow into said chamber and interference with the action of the float, there being an opening between the valve compartment and the float chamber for admitting liquid from the former to the latter to actuate the float.

3. In an automatic pipe line shut-off valve device the combination with, a body having a passage provided with an inlet and outlet, of a shut-off valve having means for normally holding it in an open position and arranged to close the inlet end of the passage of the body when the level of the liquid reaches a predetermined stage, whereby the shut-off valve acts to prevent air passing through the device, and a pressure release valve set to resist suction on the downstream side and to open to fluid pressure exceeding atmospheric pressure from the upstream side when the shut-off valve is closed.

4. In an automatic pipe line shut-off valve device the combination with, a body having a passage provided with an inlet and outlet of a shut-off valve having means for normally holding it in an open position and arranged to close the inlet end of the passage of the body when the level of the liquid reaches a predetermined stage, whereby the shut-off valve acts to prevent air passing through the device, and a pressure release valve mounted in the shut-off valve and set to resist suction on the downstream side and to open to fluid pressure exceeding atmospheric pressure from the upstream side when the shut-off valve is closed.

5. An automatic pipe line shut-off valve device including, an upright body having means for dividing it into a valve compartment and a float chamber, an inlet at the upper end of the float chamber, a trough extending from the inlet across the float chamber for discharging liquid into the valve compartment, a conductor leading from the valve compartment and having a valve seat at its inlet, a valve pivoted in the valve compartment and arranged to automatically engage the seat of the conductor, valve holding means engaging the valve for holding it in an open position and provided with a float disposed in the float chamber, the trough being sufficiently deep to carry a small stream flow across the float chamber and prevent overflow into said chamber and interference with the action of the float, and an opening between the valve compartment and the float chamber for admitting liquid from the former to the latter to actuate the float.

6. An automatic pipe line shut-off valve device including, a body having a passage provided with an inlet and outlet, a shut-off valve having latch means for normally holding it in an open position and arranged to release and close the inlet end of the passage of the body when the flow condition of the fluid reaches a predetermined stage, and a pressure release valve mounted in the shut-off valve and set to resist suction on the downstream side and to open to fluid pressure exceeding atmospheric pressure from the upstream side when the shut-off valve is closed.

ORVILLE C. WATSON.